United States Patent
Joppig et al.

[11] Patent Number: 6,138,645
[45] Date of Patent: Oct. 31, 2000

[54] METHOD OF HEATING THE INTAKE AIR

[75] Inventors: Peter Joppig; Friedrich Schmid, both of Korb; Wolfram Schmid, Nürtingen, all of Germany

[73] Assignee: DaimlerChrysler AG, Stuttgart, Germany

[21] Appl. No.: 09/448,529

[22] Filed: Nov. 23, 1999

[30] Foreign Application Priority Data

Nov. 24, 1998 [DE] Germany .......................... 198 54 077

[51] Int. Cl.$^7$ .................................................. F02N 17/04
[52] U.S. Cl. ........................... 123/556; 123/179.21
[58] Field of Search ................ 123/556, 179.21

[56] References Cited

U.S. PATENT DOCUMENTS

| | | | |
|---|---|---|---|
| 4,122,679 | 10/1978 | Charron | 123/556 |
| 4,399,774 | 8/1983 | Tsutsumi | 123/556 |
| 5,094,198 | 3/1992 | Trotta et al. | 123/556 |
| 5,347,966 | 9/1994 | Mahon et al. | 123/556 |
| 5,482,013 | 1/1996 | Andrews et al. | 123/556 |

FOREIGN PATENT DOCUMENTS 196 16 651
A1  10/1997  Germany .

*Primary Examiner*—M. McMahon
*Attorney, Agent, or Firm*—Kenneth H.. Maclean

[57] ABSTRACT

In the method, the intake air for an internal combustion engine is heated both during the starting and/or warm-running phases by at least one electrically heatable heating element arranged upstream of the air inlet to the internal combustion engine and wherein the heating period for the pre-start is selected on the basis of the temperature of the cooling water of the internal combustion engine and the temperature of the unheated air taken in by the internal combustion engine, and the heating period for the post-start is selected independently of the pre-start heating time and selected solely on the basis of the cooling-water temperature.

7 Claims, 1 Drawing Sheet

METHOD OF HEATING THE INTAKE AIR

CROSS REFERENCE TO RELATED APPLICATION

Priority is claimed with respect to German Application No. 198 54 077.9-15 filed in Germany on Nov. 24, 1998, the disclosure of which is incorporated herein by reference.

BACKGROUND OF THE INVENTION

The invention relates to a method of heating the intake air, especially for an internal combustion engine in the starting phase and warm-running phase.

Heating the intake air in internal combustion engines, in particular in diesel internal combustion engines in the starting and warm-running phase, is required for a number of reasons. At low ambient temperatures and consequently low intake-air temperatures, especially in the case of diesel engines, an inadequate final compression temperature occurs, and therefore an increasing emission delay, that is to say the time from the entry of the fuel into the combustion chamber until the ignition of the same becomes too long. Furthermore, at low intake temperatures, local over-enrichment, incomplete combustion and high pressure gradients occur as a result of abrupt mixture conversion in the cylinder. The consequences are a sharply increased emission of hydrocarbons in the exhaust gas and the knocking of the diesel engine, as well as the disadvantages resulting from this, such as severe loading of the environment and increased loading of the parts of the propulsion unit.

The general prior art discloses a method of preheating the intake air in which electrically heatable heating elements are used, and the pre-start glow time and post-start glow time of the same are defined by a time-controlled relay to only one value in each case for the pre-start glow time and the post-start glow time. The pre-start glow time is to be understood as that period during which the heating element is heated and gives off heat to the intake air before the starter sets the crankshaft moving in the known way. The post-start glow time is the period during which the heated heating element gives off heat to the intake air after the starter has begun to rotate the crankshaft of the internal combustion engine. During the pre-start glow time and the post-start glow time, the cold intake air coming from the environment or from a charging-air cooler is heated by flowing past a heating wire of the heating element.

Optimum adaptation of the pre-start glow time and of the post-start glow time of the heating element to the ambient temperature or intake-air temperature is not possible. Thus, on the one hand the pre-start glow time and the post-start glow time can be too long, which means virtually that more electrical energy is consumed than is actually necessary and therefore leads to unnecessary weakening of the capacity of the starter battery. On the other hand, the pre-start glow time and the post-start glow time of the heating elements may be too short, because of extremely low air temperatures, which once more leads to the consequences already mentioned above, such as ignition delay and increasing the HC emissions in the exhaust gas, or to its being impossible for the engine to start up at all. If the pre-start glow time and the post-start glow time of the heating element are to be adapted to the given boundary conditions, an additional control or regulating unit is necessary.

The journal MTZ (Motortechnische Zeitschrift [Motor Engineering Journal] 58, 1997; Issue 4) discloses a method of heating the intake air in which a heating element having a self-regulating heating wire is used. The use of a self-regulating heating element is intended to adapt the heating of the intake air in an optimum way to the given air temperatures.

The disadvantage with this method is that a heating flange which is more complicated in its construction and therefore more expensive is required to implement it. Furthermore, this method cannot be extended to diesel internal combustion engines which are already in use or to internal combustion engines which are operated with relatively frequently changing fuels having a very different ignition or combustion behaviour, without a considerable outlay on conversion being necessary for this. In addition, it is not possible for the heating element used in this method to react to other boundary conditions than the intake-air temperature.

SUMMARY OF THE INVENTION

The present invention is therefore based on the object of providing a method of heating the intake air in which the pre-start glow times and the post-start glow times can be matched exactly to the relevant temperature parameters and boundary conditions.

The method according to the invention of heating the intake air makes it possible to use the components which are, for example, present in any case on an electronically controlled diesel internal combustion engine having electrically heatable air preheating to adapt the pre-start glow time and the post-start glow time of the electrically heatable heating element in an optimum way to the given ambient temperature and therefore to the intake-air temperature. Moreover, the pre-start glow time and the post-start glow time can also be adapted individually to fuels which have a somewhat changed ignition and combustion behaviour at low temperatures. As a result of the method according to the invention of heating the intake air, no separate controller or regulator is therefore necessary. Furthermore, the heating elements previously used, which are of a very simple construction, can still be used. As a result, the method according to the invention of heating the intake air can also be used in older electronically controlled diesel internal combustion engines which are already in use with very low outlay on conversion, since in this case all that is needed is a software adaptation, associated with relatively little outlay, of the data set stored in an engine electronics unit.

BRIEF DESCRIPTION OF THE DRAWINGS

Advantageous refinements and developments of the invention emerge from the exemplary embodiment which is presented in principle below with reference to the drawings, in which.

DETAILED DESCRIPTION OF THE PREFERRED EMBODIMENTS

Figure 1:
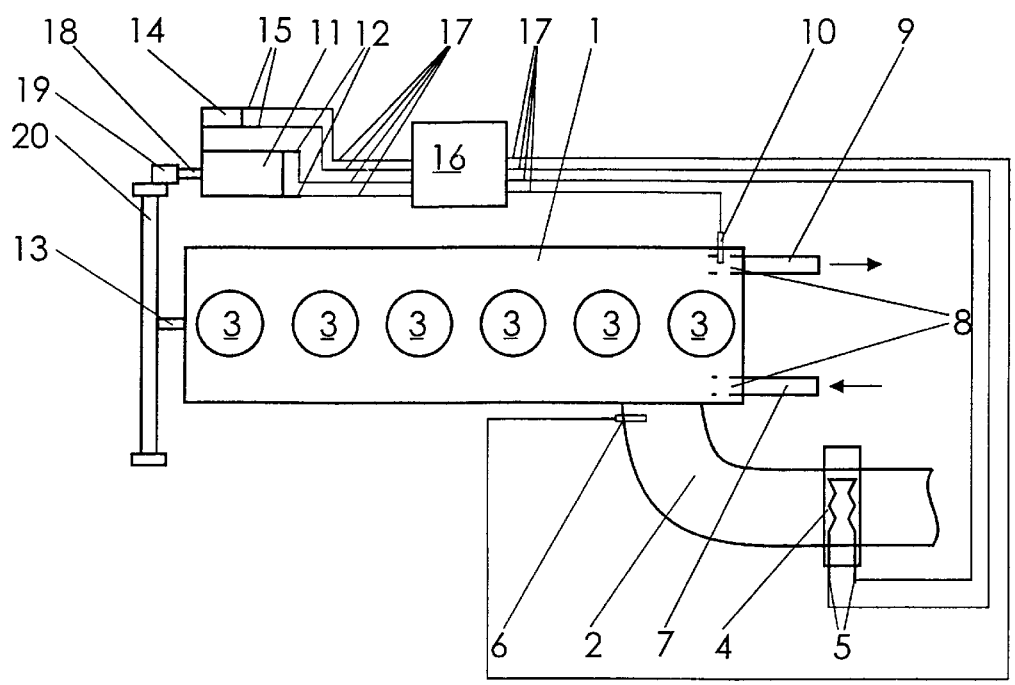
FIG. 1 shows a diesel internal combustion engine having peripheral components connected thereto.

An internal combustion engine 1 is illustrated schematically in FIG. 1. Fixed to the internal combustion engine 1 is an air intake pipe 2, which feeds the air needed for combustion directly from the environment or from a charging-air cooler (not illustrated) to the six cylinders 3 of the internal combustion engine 1. Arranged in the interior of the air intake pipe 2 is a heating element 4 having two electrical connections 5. The heating element 4 is supplied with electrical power via the two electrical connections 5. The heating element 4 operates on the principle of an electrical resistance heating wire. In the interior of the air intake pipe 2, a temperature sensor 6 is arranged downstream of the heating element in the flow direction. The temperature sensor 6 measures the temperature of the combustion air directly upstream of the inlet into the cylinders 3 of the internal combustion engine 1.

Also to be seen in FIG. 1 are two cooling-water connections of the internal combustion engine 1. A cooling-water inlet connection 7, at which cooled cooling water flows into an internal cooling circuit 8, indicated by a dashed line, of the internal combustion engine 1, and a cooling-water outlet connection 9, through which the warmed cooling water flows back into a cooler (not illustrated). A further temperature sensor 10, which is arranged at the end, in the flow direction (indicated by arrows), of the internal cooling circuit 8 of the internal combustion engine 1, in the region of the cooling-water outlet connection 9, registers the temperature of the cooling water.

Moreover, FIG. 1 illustrates a starter 11 which can be driven electrically and has two electrical connections 12 and which, in the starting phase of the internal combustion engine 1, drives a crankshaft 13 of the latter in a known way. Arranged at the starter 11 itself is an engagement device 14, which likewise has two electrical connections 15.

The temperature sensors 6, 10 for intake air and cooling water, the heating element 4, the starter 11 and the engagement device 14 are all connected electrically via appropriate lines 17 to an engine electronics unit 16 which is always present in diesel internal combustion engines 1 which are regulated or controlled electronically. All the data which are necessary for operation or the control of the internal combustion engine 1 and its peripheral components, as a function of the corresponding boundary conditions, are stored in data sets in the engine electronics unit 16. The engine electronics unit 16 controls or regulates the entire method according to the invention of heating the intake air by means of the components involved therein, by driving the latter appropriately. A pre-start glow time and a post-start glow time of the heating element 4 which is used for heating the intake air can thus also be defined individually by means of simple software adaptation in the engine electronics unit 16. The pre-start glow time and the post-start glow time are selected on the basis of the cooling-water temperature of the internal cooling circuit 8 of the internal combustion engine 1 and the intake-air temperature in the air intake pipe 2, or are a function of these temperatures. The values for the pre-start glow time and the post-start glow time have to be defined in the engine electronics unit 16 in a manner specific to the application, as a corresponding characteristic, based on the cooling-water temperature and the intake-air temperature.

The method according to the invention of heating the intake air proceeds in the order described below. When the starter switch (not illustrated) is operated, the engine electronics unit 16 and the electrical network and the components connected to the latter are placed into a type of stand-by state. The temperature of the cooling water in the internal cooling circuit 8 of the internal combustion engine 1, and the temperature of the intake air in the air intake pipe 2 are determined via the temperature sensors 6, 10, and their values are read into the engine electronics unit 16. By means of the data set defined in the engine electronics unit 16, the pre-start glow time and the post-start glow time of the heating element 4 are then determined independently of each other. The engine electronics unit 16 outputs a signal by means of which the heating element 4 is switched on and supplied with electrical energy.

After the pre-start glow time has expired, the starter 11 is engaged in a known way via the engagement device 14. After the engagement operation has been completed, the starter 11 is supplied with electrical power, as a result of which a starter shaft 18 begins to rotate and, via a toothed pinion 19 fitted to the starter shaft 18 and a gearwheel 20 fitted to the crankshaft 13 of the internal combustion engine 1, drives the crankshaft 13 until the internal combustion engine 1 runs by itself.

In the phase in which voltage is present on the electrical connections 12 of the starter 11, the power supply to the heating element 4 is interrupted, in order to avoid excessive loading of the electrical network and a starter battery which may possibly be dimensioned to be very small. This is particularly advantageous, since starter batteries have a capacity which is reduced considerably in any case, especially at very cold ambient temperatures. If there is an adequate battery capacity, the interruption to the power supply to the heating element 4 can be dispensed with. As a result, still better heating of the intake air is then achieved.

As soon as the internal combustion engine 1 starts to run by itself, the post-start glow time of the heating element 4 begins. The post-start glow time has already been determined at the beginning of the starting operation via the data set defined in the engine electronics unit. The post-start glowing action provides specific support for the smooth running of the still cold internal combustion engine 1.

If the temperature sensor 10 which measures the cooling-water temperature fails, the oil temperature is used as a substitute for determining the pre-start glow time and the post-start glow time, this temperature likewise being determined by a temperature sensor (not illustrated) arranged in the oil circuit (not illustrated) of the internal combustion engine 1. If the temperature sensor 6 which measures the intake-air temperature fails, the cooling-water temperature is used as a substitute for determining the pre-start glow time and the post-start glow time. As a result, virtually optimum adaptation of the pre-start glow time and of the post-start glow time of the heating element 4 to predefined boundary conditions is possible, even in the event of failure of one of the two temperature sensors 6, 10.

Figure 2:
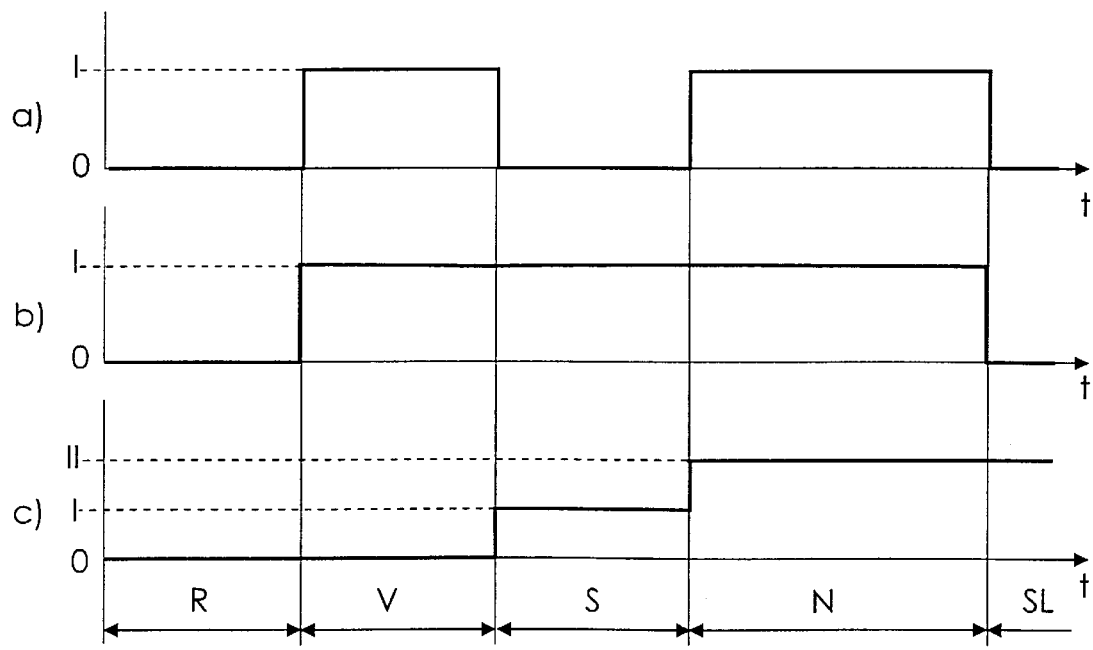
FIG. 2 shows a time sequence diagram for two starting variants, with the operating states of the heating element and of the engine.

FIG. 2 illustrates a time sequence diagram with the states of the heating element 4, once with an interruption and once without an interruption of the application of power to the heating element 4 in the direct starting phase of the internal combustion engine 1, as well as the corresponding state of the internal combustion engine 1, the y-axis reproducing the respective state of the heating element 4 and the internal combustion engine 1, respectively, and the x-axis reproducing the time.

Section a of FIG. 2 shows the state variation of the heating element 4 for the case in which the application of power to the heating element 4 is interrupted during the actual starting operation. In this case, the state 0 corresponds to the unheated state, and I corresponds to the heated state of the heating element 4.

Section b of FIG. 2 shows the state variation of the heating element 4 for the case in which the power supply to the heating element 4 is stopped only after the post-start glow time has expired.

Section c of FIG. 2 illustrates the state graph of the internal combustion engine 1 which is equivalent to the two state variations of the heating element 4. In this case, 0 corresponds to standstill of the internal combustion engine 1, the state I corresponds to the phase of the starting operation, during which the crankshaft 13 of the internal combustion engine 1 is driven by the starter 11. The state II is the operating state in which the internal combustion engine has changed to running by itself, that is to say driving the crankshaft 13 of the internal combustion engine 1 by means of the starter 11 is no longer necessary. The starting and warm-running phase of the internal combustion engine 1 illustrated in a sequence diagram in FIG. 2 may be divided into five different time sequence stages. In the quiescent phase R, the heating element 4 is in the unheated state and the internal combustion engine 1 is stationary. In a phase V, which begins when a starting signal is received, the heating element 4 is supplied with power. After the expiry of this time period, which is determined by the engine electronics unit 16 on the basis of the temperatures of the intake air and of the cooling water determined by the temperature sensors 6, 10 at the beginning of phase V, the power supply to the heating element 4 is interrupted, as illustrated in FIG. 2*a*. As an alternative to this, for the reasons explained above, the power supply to the heating element 4 can be maintained, of course. In both cases, after the expiry of the time period designated by V in the diagram, the actual starting operation S of the internal combustion engine 1 begins with the engagement of the toothed pinion 19 of the starter 11 in the gearwheel 20 fitted to the crankshaft 13 of the internal combustion engine 1. At the instant at which the internal combustion engine 1 runs without the support of the starter 11, the post-start glow phase designated by N in the diagram begins. The time period of this phase has already been defined by the engine electronics unit, at the beginning of the section designated by V in the diagram, on the basis of the temperatures of the cooling water and of the intake air determined via the two temperature sensors 6, 10.

While the above description constitutes the preferred embodiment of the invention, it will be appreciated that the invention is susceptible to modification, variation, and change without departing from the proper scope or fair meaning of the accompanying claims.

What is claimed is:

1. A method of heating the intake air for an internal combustion engine in the starting and warm-running phase, by means of at least one electrically heatable heating element arranged upstream of the air inlet to the internal combustion engine, by means of which method a pre-start glow time and a post-start glow time for the intake air are defined, the air heating method including the steps of:

selecting the pre-start glow time during which the heating element (4) is energized on the basis of the temperature of the cooling water of the internal combustion engine (1) and the temperature of the unheated air taken in by the internal combustion engine (1), and selecting the post-start glow time during which the heating element (4) is energized only on the basis of the cooling-water temperature.

2. The method of heating the intake air according to claim 1, and an engine control electronics unit (16) of the internal combustion engine (1) defining individually the pre-start glow time and the post-start glow time of the electrically heatable heating element (4) for various cooling-water temperatures and intake-air temperatures.

3. The method of heating the intake air according to one of claim 1 or 2, characterized in that the temperature of the intake air is determined by at least one temperature sensor (6) which is located in the air intake pipe (2), between the heating element (4) and the internal combustion engine (1).

4. The method of heating the intake air according to one of claim 1 or 2, characterized in that the temperature of the cooling water is determined by at least one temperature sensor (10) which is located, as viewed in the flow direction, at the end of the internal cooling circuit (8), in the region of the cooling-water outlet connection (9).

5. The method of heating the intake air according to one of claim 1 or 2, characterized in that the electrical power supply to the heating element (4) is interrupted during the firing of the internal combustion engine (1).

6. The method of heating the intake air according to claim 4, and selecting the glow times during which the heating element (4) is energized on the basis of engine oil temperature whenever the temperature sensor (10) provided for determining the cooling-water temperature fails to signal the engine control electronics unit (16).

7. The method of heating the intake air according to claim 3, and selecting the glow times during which the heating element (4) is energized on the basis of the cooling water temperature whenever the temperature sensor (6) provided for determining the unheated air taken in fails to signal the engine control electronics unit (16).

* * * * *